United States Patent [19]

Bich

[11] Patent Number: 5,090,532

[45] Date of Patent: Feb. 25, 1992

[54] DUAL TORQUE CLUTCH

[75] Inventor: Gary L. Bich, New Holland, Pa.

[73] Assignee: Ford New Holland, Inc., New Holland, Pa.

[21] Appl. No.: 646,406

[22] Filed: Jan. 28, 1991

[51] Int. Cl.⁵ .................. F16D 43/202; F16D 7/04
[52] U.S. Cl. .................. 192/56 R; 192/71; 464/37
[58] Field of Search .......... 192/56 R, 71, 107 T; 464/30, 37

[56] References Cited

U.S. PATENT DOCUMENTS

| | | | |
|---|---|---|---|
| 415,653 | 11/1889 | Racine | 464/37 |
| 2,909,047 | 10/1959 | Walterscheid-Müller et al. | 192/56 R X |
| 2,930,212 | 3/1960 | Walterscheid-Müller et al. | 192/56 R X |
| 4,261,453 | 4/1981 | Kunze | 192/56 R |
| 4,417,650 | 11/1983 | Geisthoff | 192/56 R |
| 4,566,570 | 1/1986 | Geisthoff | 192/56 R |
| 4,653,623 | 3/1987 | Demorest | 192/56 R |
| 4,792,321 | 12/1988 | Lundquist | 464/35 |

Primary Examiner—Richard Lorence
Attorney, Agent, or Firm—Shlesinger Arkwright & Garvey

[57] ABSTRACT

A clutch assembly for preventing overloading in drive lines in machinery. The assembly includes first and second clutch sleeves having first and second sets of recesses respectively. A clutch hub engages the sleeves with a plurality of spring loaded drive members for releasably engaging recesses in the clutch sleeve. One set of the recesses having equal torques in both forward and reverse direction. The second set of recesses are shaped to transmit more torque in the reverse direciton than in a forward direction.

6 Claims, 2 Drawing Sheets

DUAL TORQUE CLUTCH

FIELD OF THE INVENTION

This invention relates generally to clutch mechanisms and, more particularly, to a safety clutch for protecting machine drive lines in the drive shafts of agricultural harvesting implements.

BACKGROUND OF THE INVENTION

A clutch mechanism of the type to which the present invention relates generally consists of a clutch hub and a clutch sleeve. Spring loaded drive members resiliently extend from pockets in the clutch hub to engage with recesses of the clutch sleeve to effect torque transmission between the hub and the sleeve. It is known in the prior art to form the heads of the drive members with wedged engagement heads which are biased outwardly to enter recesses formed on the wall of the clutch sleeve.

Safety clutches operating on the principle of a clutch ratchet are generally known in the art. In the patent of Kunze, U.S. Pat. No. 4,261,453, two embodiments of sleeve recesses are shown in FIGS. 3 and 4, respectively. In one embodiment the side surfaces forming the recesses extend at different angles with respect to a radial plane passing through the intersection of the sides. In such an arrangement, a greater torque can be transmitted in one direction of rotation than in the reverse direction of rotation. In the other embodiment, the recesses into which the drive members seat have uniform side surfaces so that the torque transmitted in each direction is equivalent.

These types of clutches are generally used in agricultural equipment having an auger rotating on an axis perpendicular to the direction of travel of the machine for moving grain or hay into a loading compartment of the implement. From time to time the auger will get hung up by materials being gathered and sometimes hang up will be caused by foreign materials such as baling string or wire getting caught around the auger causing the clutch hub to disengage from the clutch sleeve. One of the simplest ways to eject the clogging material from the auger is to reverse the direction of the clutch hub and thereby reverse the auger. However, the hang up frequently jams the auger to the extent that the force to reverse the rotation needs to be greater than the force which caused the hang up in the beginning.

This disadvantage is not overcome by the prior art. If the recesses of the clutch sleeve have equal limiting angles, then the force exerted on the sleeve to cause slippage in either direction will be equivalent, and therefore, the clutch will tend to slip in the reverse direction as well as the forward direction.

When a clutch sleeve is manufactured to present recesses having different limiting angles of the side surfaces of the recesses, different torques can be applied to the forward and reverse directions of rotation. Generally, these two torque clutch sleeves are designated to have large differences between forward and reverse, because the manufacture of slightly different forward and reverse disengaging forces is difficult to accomplish. Furthermore, clutch sleeves having different torquing properties are not available in many varieties as an off-the-shelf item.

It has been found that avoidance of the above problems can be achieved by using the positive properties of the two different designs together in one clutch sleeve and thereby avoid the disadvantages of the disengaging clutches of the prior art.

OBJECTS AND SUMMARY OF THE INVENTION

A primary object of the invention is to provide a clutch assembly for preventing overloading in machinery.

Yet another object of the invention is to provide a clutch sleeve having a first and second sets of recesses wherein the torque transmission of one set can be greater than the torque transmission of the other set in a forward rotation and vice versa in the reverse direction so that the total disengaging force in the forward direction is less than the total disengaging force in the reverse direction.

Still another object of the invention is to provide a clutch assembly having a sleeve formed of first and second parts that are rigidly joined together along a step joint which will prevent weld material from entering the interior of the clutch sleeve and provide a smooth transition from the first part to the second part.

In summary therefore, this invention is directed to a clutch assembly for preventing overloading in drive lines and machinery, and in particular, agricultural harvesting machinery. The clutch assembly includes first and second sets of recesses on a clutch sleeve so that the forces in the forward and reverse directions of rotation of, for example, a harvesting auger are different so that unclogging of the harvesting auger can be achieved by the application of a stronger force in the reverse direction than in the forward direction. This arrangement includes a combination of recesses having equal forward and reverse force application as well as a set of recesses having unequal force distribution between forward and reverse rotation. Two separate sleeves are joined along a weld line and by varying the numbers of drive recesses having equal and unequal torquing properties, clutches having a variety of different forward and reverse torque transmissions can be readily manufactured.

The invention will now be further described in view of the drawings and following detailed description.

DETAILED DESCRIPTION OF THE INVENTION

Figure 1:
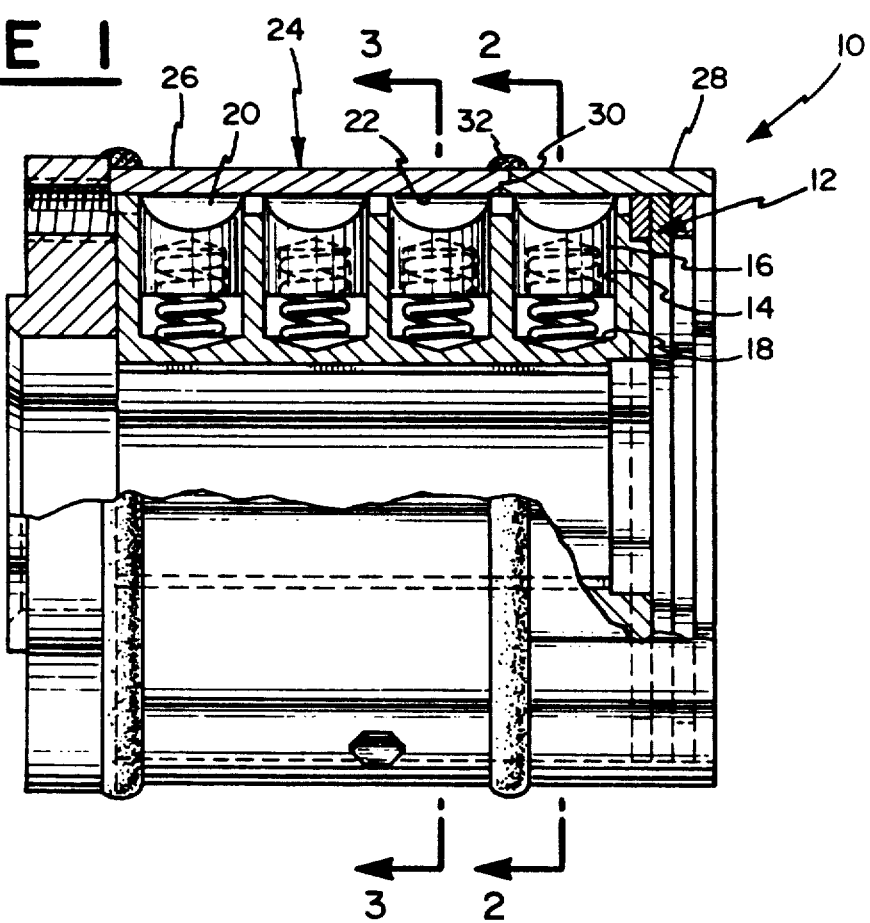
FIG. 1 is a partial sectional view taken longitudinally through an overload clutch assembly in accordance with the present invention showing two separate sleeve sections joined together at a step joint.

A clutch assembly 10 is shown in FIG. 1 as an example of the present invention having a clutch hub 12 having a plurality of pockets 14 for retaining individual driving members 16. Driving members 16 are generally biased outwardly from pockets 14 by spring members 18 Driving members 16 have wedge shaped heads 20 which engage with the interior wall 22 of outer sleeve 24.

Outer sleeve 24 is formed of at least two wall sections 26 and 28 which are preferable joined together at a step joint 30 which provides a smooth interior wall 22. After weld 32 is applied the step structure prevents weld material from flowing through the joint 30.

It should be understood that while in FIG. 1, wall section 26 covers three of driving members 16 and wall section 28 covers only one driving member 16, the number of driving members 16 covered by each of wall sections 26 and 28 may be varied according to desired forward and revere torques.

Figure 2:
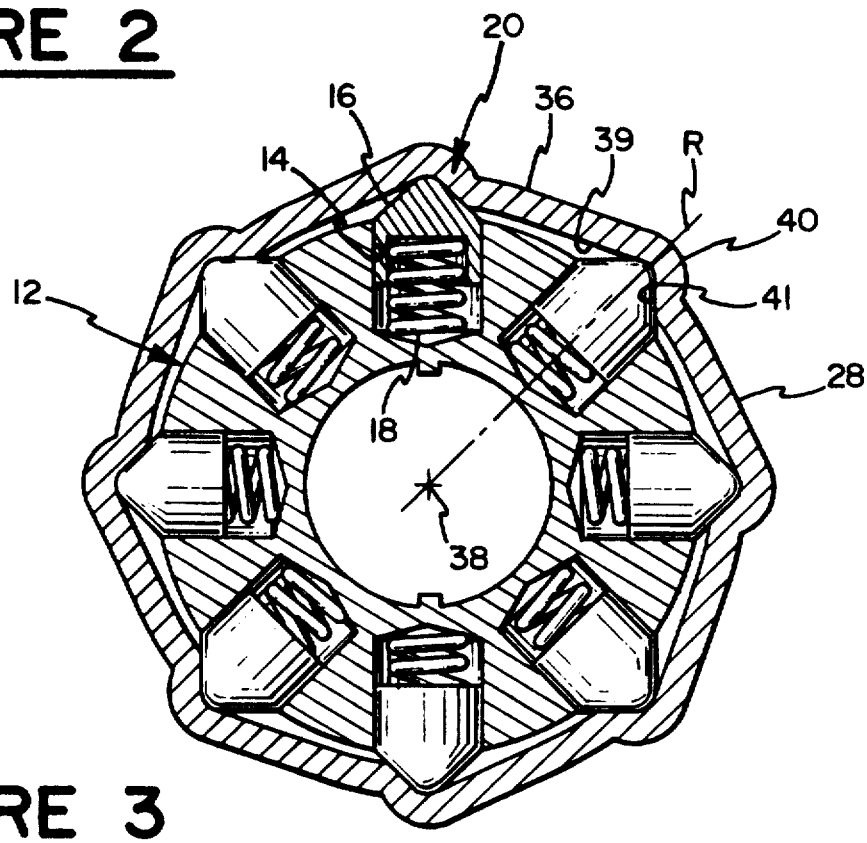
FIG. 2 is a cross-section taken long line 2—2 of the clutch assembly of FIG. 1 showing a variable torque clutch sleeve.
Figure 3:
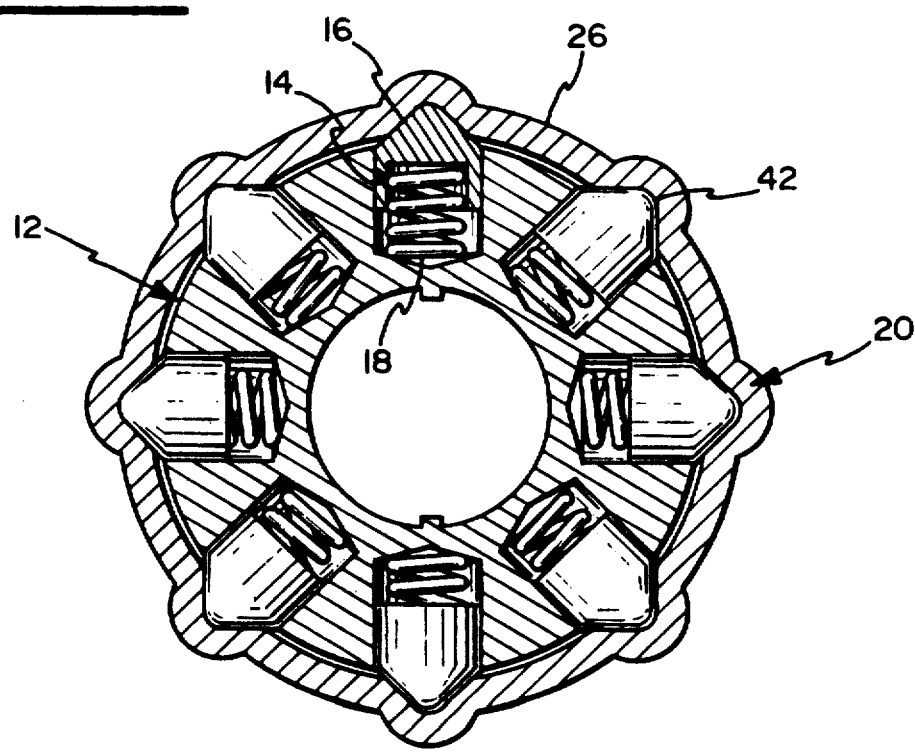
FIG. 3 is a cross-section taken along 3—3 of FIG. 1 showing a clutch sleeve having recesses for providing equal transmission of rotational force in both the forward and reverse direction.

Now referring to FIGS. 2 and 3, it can be observed that FIG. 2 includes a variable torque sleeve design of wall section 28 taken along line 2—2 of FIG. 1. In this configuration a clockwise motion of the clutch hub 12 will provide a greater torque before disengaging from wall section 28 than is possible in the counterclockwise direction because of the angles of the interior recesses 34 of the wall section 28. As can be clearly seen, the angle of the forward counterclockwise direction wall 36 is closer to being perpendicular to a radial extending from the clutch hub center 38, thus giving the driving member 16 a flatter surface 39 to engage offering less resistance. On the otherhand the reverse direction wall 40 has a sharper incline 41 giving a higher frictional resistance against the head 20 of driving member 16 to provide a higher torque before slippage begins in the clockwise direction.

FIG. 3 is a cross-section taken long line 3—3 of FIG. 1 and shows the wall section 26 surrounding clutch hub 12. In this wall section, recesses 42 provide equal resistance in the clockwise and counterclockwise rotation.

The primary advantage to using two distinct sleeve designs joined together allows the use of stock sleeves which are readily available and can be arranged so that a required number of driving members 16 can be used in either wall section 26 or wall section 28 to provide the desired forward and reverse torques. A combination sleeve design permits achievement of variable sleeve torque requirements without going to the expense of attempting to design an individual variable torque sleeve for each possible alternative torque requirement and permits the machinery manufacturer to buy readily available stock sleeves and conform them to the manufacturer's torque requirement for an individual implement.

Figure 4:
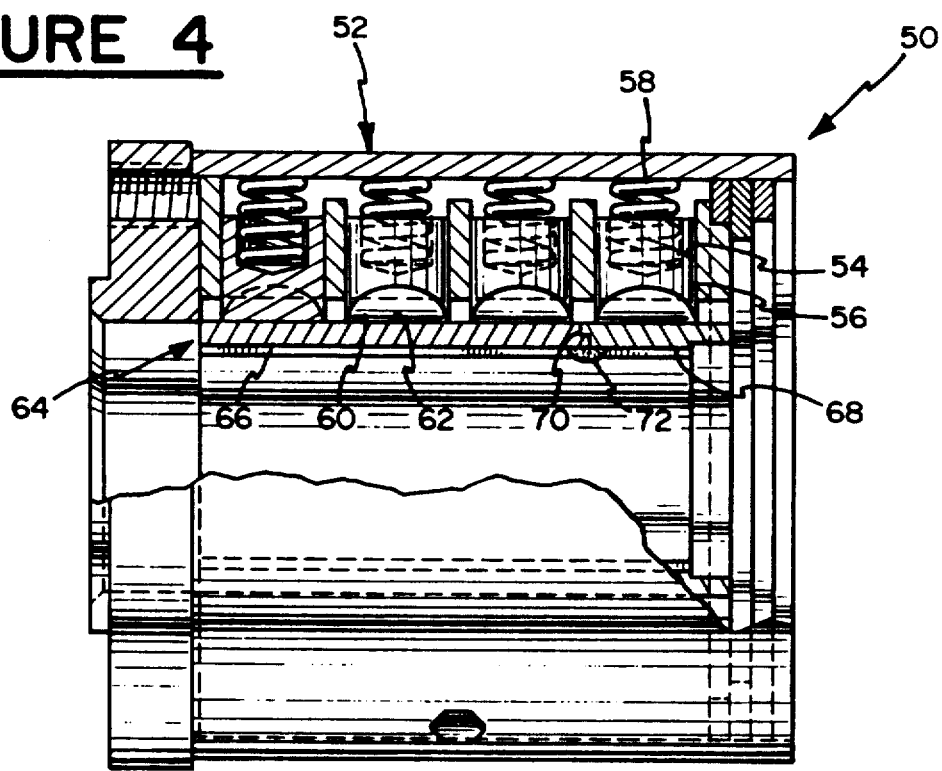
FIG. 4 is a partial sectional view taken longitudinally through an overload clutch assembly showing a second embodiment where the clutch sleeve is located interiorly of the hub.

It should be understood that sleeves having interior recesses as well as exterior recesses can both be used to form the clutch assembly using the principle of combining multiple clutch sleeves as shown in the second embodiment illustrated in FIG. 4. FIG. 4 shows a clutch assembly 50 having an outer clutch hub 52 having a plurality of pockets 54 for retaining individual drive members 56. Driving members 56 are biased inwardly from pockets 54 by spring members 58. Driving members 56 have wedged shaped heads 60 for engaging the exterior wall 62 of inner sleeve 64. Inner sleeve 64 is formed of at least two wall sections 66 and 68 which are preferably joined together at a step joint 70 to provide a smooth exterior wall 62 after weld 72 is applied as described in the first embodiment. The number of driving members 56 engaging the wall sections 66 and 68 may be varied according to desired forward and reverse torques. The combination interior sleeve design also permits achievement of variable sleeve torque requirements without the expense of designing individual variable inner torque sleeves for each possible alternative torque requirement.

While this invention has been described as having a dual torque clutch it is understood that it is capable of further modifications, uses and/or adaptations of the invention following in general the principle of the invention and including such departures from the present disclosure as come within known or customary practice in the art to which the invention pertains, and as may be applied to the central features hereinbefore set forth, and fall within the scope of the invention and the limits of the appended claims.

I claim:

1. A clutch assembly for preventing overloading in drive lines in machinery, said clutch assembly comprising:
   (a) a clutch housing assembly including a clutch hub and first and second sleeves connected together in operable engagement with said hub;
   (b) said first sleeve having a first set of recesses, said second sleeve having a second set of recesses;
   (c) said clutch hub having a plurality of biased drive members for releasably engaging said recesses of said first and second clutch sleeve;
   (d) said clutch hub being rotatable in forward and reverse direction;
   (e) said first set of recesses being shaped to transmit equal torque during rotation in both forward and reverse direction;
   (f) said second set of recesses being shaped to transmit more torque in the reverse direction than in the forward direction;
   (g) said first sleeve and said second sleeve having a combined length equal that of said clutch hub.

2. The clutch assembly as set forth in claim 1, wherein:
   (a) said first part is connected to said second part by a step joint.

3. The clutch assembly as set forth in claim 3, wherein:
   (a) said first part is bonded to said second part at said step joint.

4. The clutch assembly as set forth in claim 3, wherein:
   (a) the bond between the first part and second part is a weld.

5. The clutch assembly as set forth in claim 1, wherein:
   (a) said first set and said second set of recesses are located on an interior wall of said clutch sleeve; and,
   (b) said clutch hub is located within said clutch sleeve.

6. The clutch assembly as set forth in claim 1, wherein:
   (a) said first set of recesses and said second set of recesses are located on a exterior wall of said clutch sleeve; and,
   (b) said clutch hub is located adjacent said exterior wall of said clutch sleeve.

* * * * *